(12) United States Patent
Nishiura

(10) Patent No.: US 8,051,739 B2
(45) Date of Patent: Nov. 8, 2011

(54) VEHICLE-USE TRANSMISSION MANIPULATING DEVICE

(75) Inventor: Hisao Nishiura, Saltama (JP)

(73) Assignee: Honda Motor Co., Ltd., Tokyo (JP)

( * ) Notice: Subject to any disclaimer, the term of this patent is extended or adjusted under 35 U.S.C. 154(b) by 490 days.

(21) Appl. No.: 11/451,369

(22) Filed: Jun. 13, 2006

(65) Prior Publication Data

US 2006/0283648 A1  Dec. 21, 2006

(30) Foreign Application Priority Data

Jun. 16, 2005  (JP) .................................. 2005-176909

(51) Int. Cl.
  *B60K 20/00* (2006.01)
  *G05G 1/30* (2008.04)
  *B62H 1/08* (2006.01)

(52) U.S. Cl. ......................... 74/473.16; 74/560; 280/294

(58) Field of Classification Search .................... 74/560, 74/473.16, 473.1, 473.17, 478; 180/219, 180/230; 280/288.4, 291, 294
  See application file for complete search history.

(56) References Cited

U.S. PATENT DOCUMENTS

| 2,237,297 | A | * | 4/1941 | Banker | 192/3.61 |
| 2,796,774 | A | * | 6/1957 | Peed, Jr. | 74/522 |
| 6,394,214 | B1 | * | 5/2002 | Hahm | 180/230 |
| 6,688,629 | B2 | * | 2/2004 | Essinger | 280/291 |
| 2005/0087032 | A1 | * | 4/2005 | Kawakubo et al. | 74/473.1 |
| 2005/0217915 | A1 | * | 10/2005 | Kosugi et al. | 180/219 |

FOREIGN PATENT DOCUMENTS

| JP | 02060891 | A | * | 3/1990 |
| JP | 5-105164 | A |   | 4/1993 |
| JP | 11342884 | A | * | 12/1999 |

* cited by examiner

*Primary Examiner* — Justin Krause
*Assistant Examiner* — Alan Waits
(74) *Attorney, Agent, or Firm* — Birch, Stewart, Kolasch & Birch, LLP

(57) ABSTRACT

A vehicle-use transmission manipulating device for substantially preventing a rider's foot from interfering with a rod thereof. In a vehicle-use transmission manipulating device having a pair of pivot support members for supporting a pivot shaft of a swing arm provided at left and right sides of a main pipe behind a transmission. A driver step and a support shaft of a change pedal are provided behind the pivot support member with the change pedal and a transmission shaft being connected with each other by way of a rod. A bell crank is arranged below the driver step. The rod includes a first rod for connecting the change pedal and the bell crank and a second rod for connecting the bell crank and the transmission shaft side. The second rod is arranged in front of the change pedal.

18 Claims, 5 Drawing Sheets

VEHICLE-USE TRANSMISSION MANIPULATING DEVICE

CROSS-REFERENCE TO RELATED APPLICATIONS

The present application claims priority under 35 USC 119 to Japanese Patent Application No. 2005-176909 filed on Jun. 16, 2005 the entire contents of which are hereby incorporated by reference.

FIELD OF THE INVENTION

The present invention relates to an improvement of a vehicle-use transmission manipulating device.

DESCRIPTION OF BACKGROUND ART

A conventional vehicle-use transmission manipulating device is known wherein a vehicle-use transmission manipulating device includes a link mechanism connected between a change pedal for transmitting and a transmission side. See, for example, JP-A-5-105164.

The vehicle-use transmission manipulating device shown in FIG. 2 of JP-A-5-105164 includes a clutch pedal 11 that is mounted on a foot rest shaft 25 which supports a foot rest 10 thereon. A shaft 7c is provided below the foot rest shaft 25 with a bell crank-shaped operating arm 7 being swingably mounted on the shaft 7c. A connecting rod 42 extends between the clutch pedal 11 and one side arm of the operating arm 7 with one end of an adjusting rod 13 being swingably connected to the other side arm of the operating arm 7. At the same time, the adjusting rod 13 extends in substantially a frontward direction of the vehicle body with a distal end of the adjusting rod 13 being connected to a shift shaft 14 of a transmission.

In the above-mentioned vehicle-use transmission manipulating device, since the adjusting rod 13 is arranged below the clutch pedal 11, there exists a possibility that, when a rider performs a gear change using the transmission, a rider's foot interferes with the adjusting rod 13.

SUMMARY AND OBJECTS OF THE INVENTION

It is an object of the present invention to provide a vehicle-use transmission manipulating device which substantially prevents a rider's foot from interfering with the rod.

According to an embodiment of the present invention, in a vehicle-use transmission manipulating device in which an engine and a transmission which is connected to the engine are arranged at the approximately center of a vehicle body, a pair of pivot support members, which supports a pivot shaft of a swing arm, is provided at left and right sides of the vehicle body behind the transmission with a transmission shaft being provided to the transmission. A step and a change pedal are provided behind the pivot support member, and the change pedal and the transmission shaft are connected with each other by way of a rod. A bell crank is arranged below the step and the rod includes a first rod which connects the change pedal and the bell crank and a second rod which connects the bell crank and the transmission shaft. The second rod is arranged in front of the change pedal.

Since the second rod is arranged in front of the change pedal, when a rider performs a gear change using the transmission, a rider's foot hardly interferes with the second rod.

According to an embodiment of the present invention, the bell crank is rotatably supported on the pivot support member.

The bell crank is supported on the pivot support member, and the pivot support member which supports a pivot shaft also serves as a support member of the bell crank. By arranging the change pedal in the vicinity of the bell crank, a distance between a connecting portion of the first rod to the change pedal and the bell crank is decreased. Thus, the first rod becomes short and lightweight.

According to an embodiment of the present invention, the bell crank and the transmission shaft are arranged in front of the change pedal, and the transmission shaft is arranged above the step.

Since the transmission shaft is arranged at a high position, it is possible to arrange the transmission shaft above an output shaft of the transmission. Thus, a distance between the output shaft and the transmission shaft in the longitudinal direction of the vehicle body can be shortened.

According to an embodiment of the present invention, the bell crank is arranged below the step. The rod includes the first rod for connecting the change pedal and the bell crank and the second rod for connecting the bell crank and the transmission shaft. The second rod is arranged in front of the change pedal. Accordingly, when a rider performs the gear change using the transmission, the rider's foot hardly interferes with the second rod. Thus, the transmission manipulability of the vehicle can be enhanced.

According to an embodiment of the present invention, the bell crank is supported on the pivot support member which supports the pivot shaft. Thus, the pivot support member also serves as the support member of the bell crank whereby the number of parts can be reduced thus bringing about a reduction of a weight of the vehicle and the reduction in the cost. Further, by arranging the change pedal in the vicinity of the bell crank, a distance between a connecting portion of the first rod with the change pedal and the bell crank becomes short. Thus, the first rod can be shortened thus reducing a weight of the vehicle.

According to an embodiment of the present invention, since the transmission shaft is arranged above the step, it is possible to arrange the transmission shaft above the output shaft of the transmission. Accordingly, a distance between the output shaft and the transmission shaft in the longitudinal direction of the vehicle body can be shortened. Thus, a longitudinal length of the engine can be shortened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
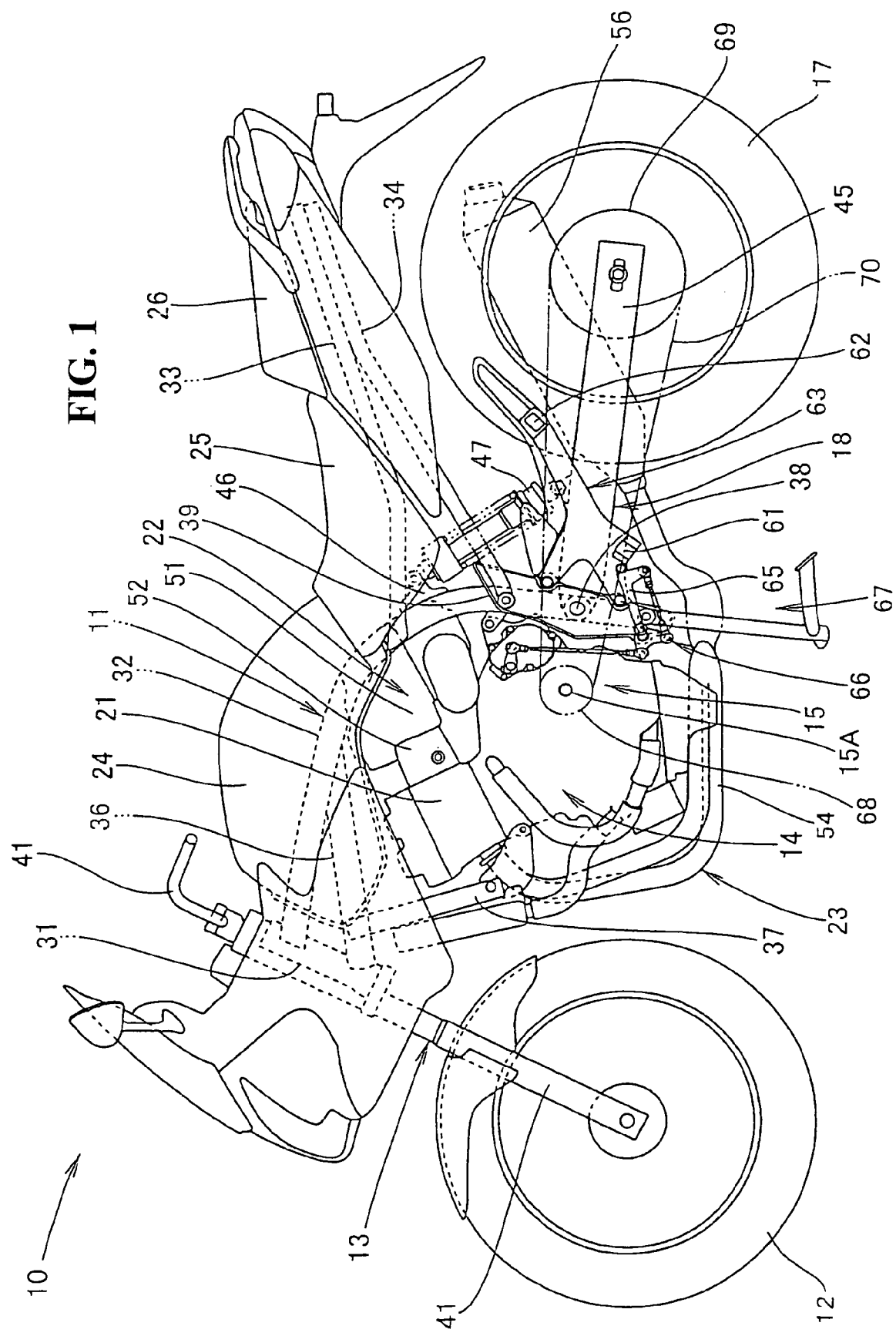
FIG. 1 is a side view of a vehicle which includes a transmission manipulating device according to the present invention.

Hereinafter, the best mode for carrying out the present invention is explained in conjunction with attached drawings FIG. 1 is a side view of a vehicle which includes a transmission manipulating device according to the present invention. A motorcycle 10 includes a vehicle body frame 11 with a front wheel 12, a front wheel steering suspension mechanism 13 which is mounted on a front portion of the vehicle body frame 11 for steering and suspending the front wheel 12, an engine 14 and a transmission 15 which are mounted on a substantially center portion of the vehicle body frame 11. A rear wheel 17 is provided with a rear wheel suspension device 18 which is mounted on a rear lower portion of the vehicle body frame 11 for suspending the rear wheel 17. An intake device 22 is mounted on a rear portion of a cylinder head 21 of the engine 14 for supplying air and fuel to the engine 14 with an exhaust device 23 which is mounted on a front portion of the cylinder head 21 for purifying and discharging an exhaust gas of the engine 14. A fuel tank 24 is provided adjacent to a rider seat 25 and a pillion seat 26 which are mounted on an upper portion of the vehicle body frame 11.

The vehicle body frame 11 includes a head pipe 31 which is mounted on a front end portion of the vehicle body frame 11, a single main pipe 32 which extends obliquely in the rearward and downward direction from the head pipe 31, a pair of left and right seat rails 33, 33 (only symbol 33 is shown in the drawing) which extend rearwardly from a rear upper portion of the main pipe 32, a pair of left and right sub frames 34, 34 (only symbol 34 is shown in the drawing) which are respectively extended between rear ends of the seat rails 33, 33 and the main pipe 32. A reinforcing pipe 36 is formed by extending a lower portion of the above-mentioned main pipe 32 obliquely in the rearward and upward direction from the head pipe 31 and connecting a distal end thereof to the main pipe 32. A pair of left and right down pipes 37, 37 (only symbol 37 is shown in the drawing) extend downwardly from the reinforcing pipe 36.

The main pipe 32 is a member for mounting a pivot shaft 38 for supporting the rear wheel suspension device 18 thereon. Both ends of the pivot shaft 38 are further supported on pivot support members 39, 39 (only symbol 39 is shown in the drawing) which are mounted on both-sides of the main pipe 32.

A power unit is an integrally-formed unit which includes the engine 14 and the transmission 15, wherein the power unit is supported on the main pipe 32 and the down pipe 37.

The front wheel steering suspension mechanism 13 includes a front fork 41 which is mounted to be steerable on the head pipe 31 and a rod handle 42 which is mounted on an upper end of the front fork 41, wherein the front wheel 12 is rotatably mounted on a lower end of the front fork 41.

The rear wheel suspension device 18 includes a swing arm 45 which is swingably mounted on a rear and lower portion of the main pipe 32 by way of the pivot shaft 38, and a rear shock absorber 47 which has one end thereof mounted on a front and upper portion of the swing arm 45 and the other end thereof mounted on the main pipe 32 by way of a bracket 46.

The intake device 22 includes an air cleaner 51 and a throttle body 52 which has a rear end thereof mounted on the air cleaner 51 and a front end thereof mounted on the cylinder head 21. The throttle body 52 includes a throttle valve and a fuel injection valve.

The exhaust device 23 includes exhaust pipes 54 that extend downwardly from a front portion of the cylinder head 21 and, thereafter, extend rearwardly for respective cylinders and, in the midst thereof, are merged to form a single pipe which extends rearwardly, and a muffler 56 which is mounted on a rear end of the single exhaust pipe 54.

The pivot support member 39 serves to support a step support member 63 which includes a rider step 61 and a pillion step 62. The step support member 63 swingably mounts a change pedal 65 for performing a gear change using the transmission 15 thereon.

The change pedal 65 is a member which is connected to the transmission 15 side by way of a link mechanism 66, wherein the change pedal 65 and the link mechanism 66 constitute a transmission manipulating device 67.

The transmission 15 is provided with an output shaft 15A. By extending a chain 70 between a drive sprocket wheel 68 that is mounted on the output shaft 15A and a driven sprocket wheel 69 that is mounted on the rear wheel 17, a driving force is transmitted to the rear wheel 17 from the output shaft 15A.

Figure 2:
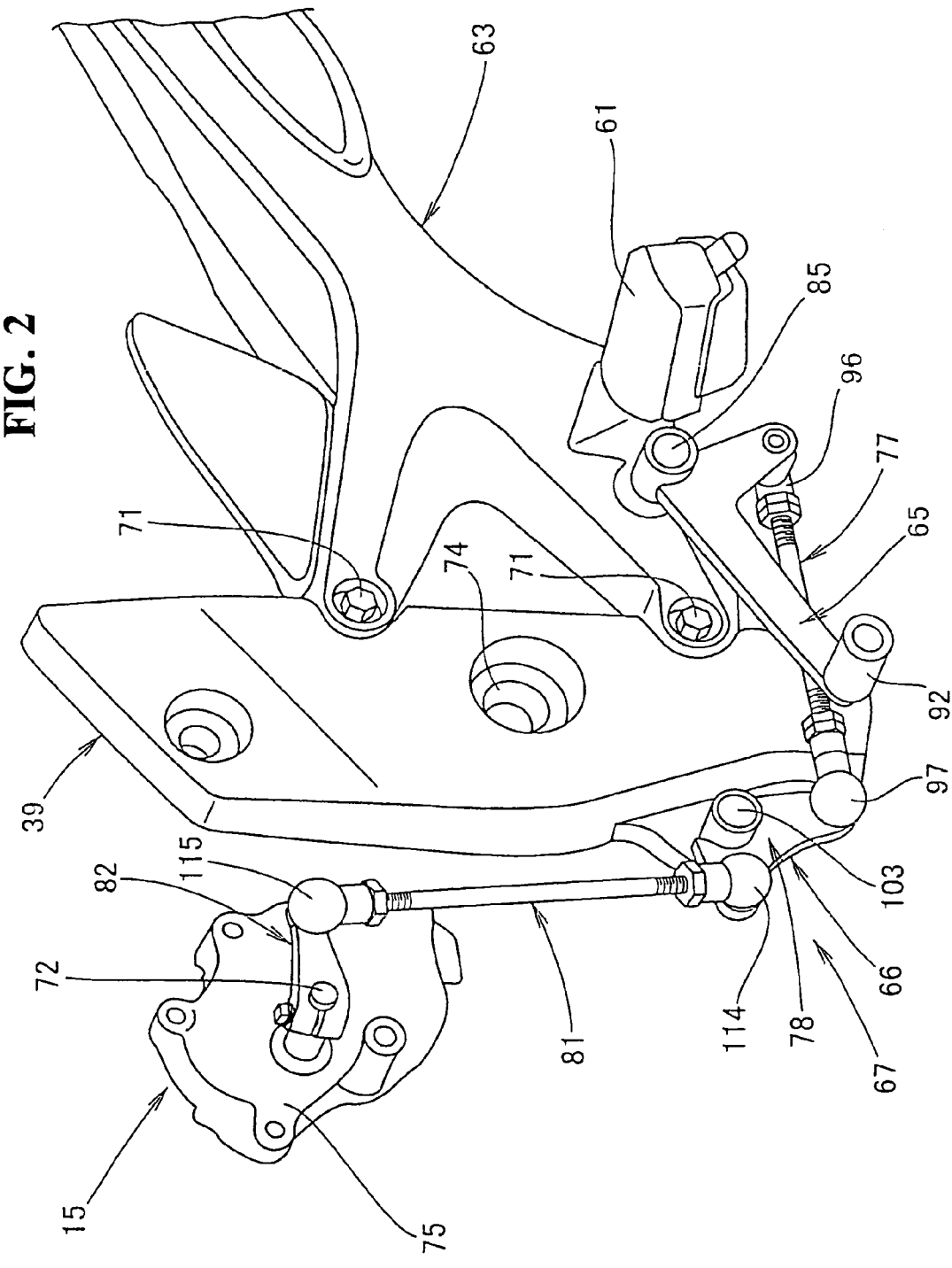
FIG. 2 is a perspective view for explaining an essential part of the transmission manipulating device according to the present invention.

FIG. 2 is an explanatory perspective view (an arrow (FRONT) in the drawing indicating a front portion of the vehicle) of an essential part of the transmission manipulating device according to the present invention. As shown in FIG. 2, the step support member 63 is mounted on the pivot support member 39 using bolts 71, 71, the change pedal 65 is mounted on the step support member 63 in a vertically swingable manner, and one end of the link mechanism 66 is connected to the change pedal 65 and the other end of the link mechanism 66 is connected to a transmission shaft 72 which is mounted on the transmission 15. A pivot shaft support hole 74 is formed in the pivot support member 39 for supporting the pivot shaft 38 (see FIG. 1). A cover 75 covers a periphery of the transmission shaft 72.

The link mechanism 66 includes a first rod 77 which has one end thereof connected to the change pedal 65, a bell crank 78 which is connected to the other end of the first rod 77 and is swingably mounted on the pivot support member 39, a second rod 81 which has one end thereof connected to the bell crank 78, and a transmission shaft arm 82 which is connected to the other end of the second rod 81 and is mounted on the transmission shaft 72.

Figure 3:
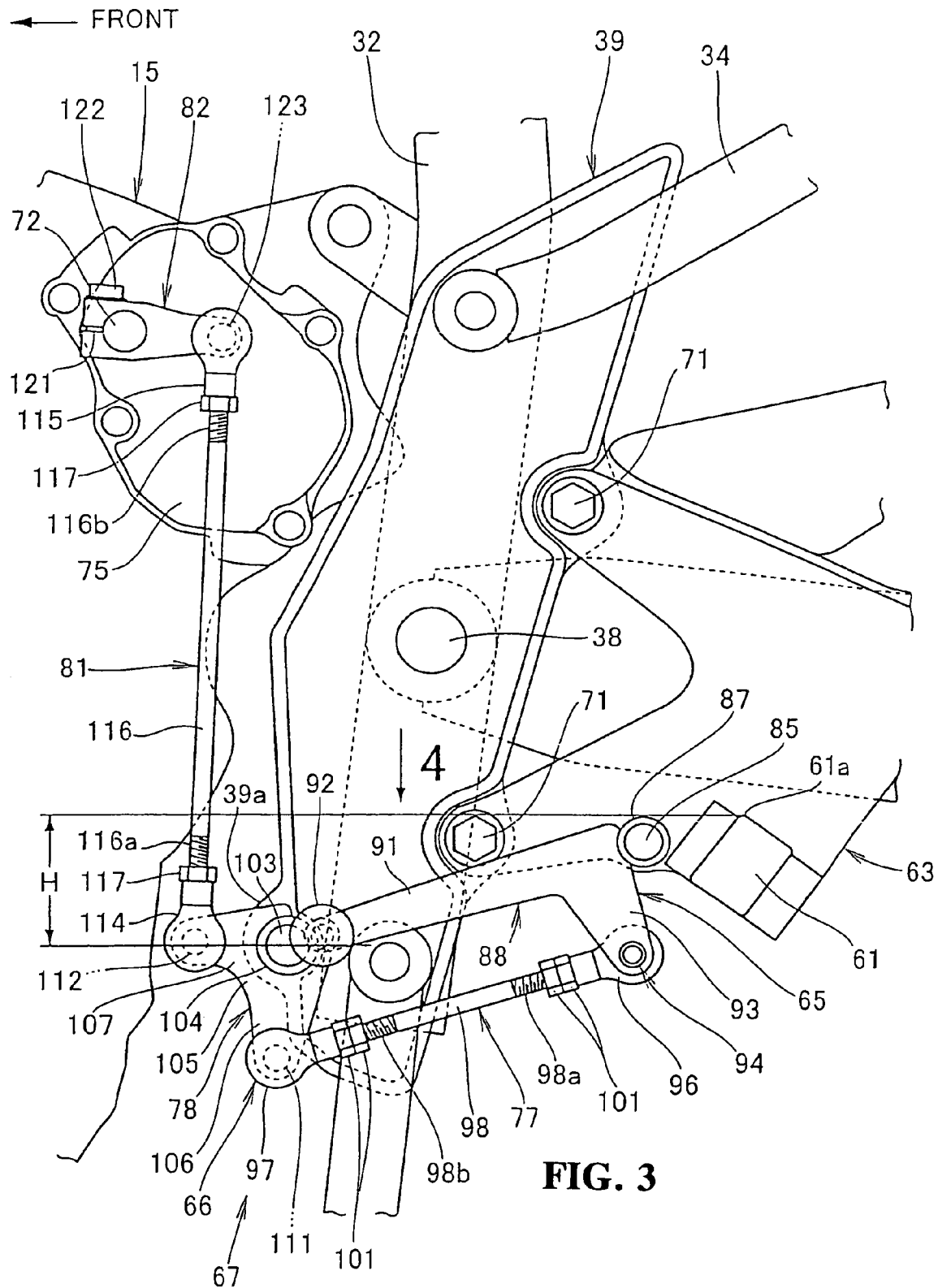
FIG. 3 is a side view for explaining an essential part of the transmission manipulating device according to the present invention.

FIG. 3 is a side view of an essential part for explaining the transmission manipulating device according to the present invention. In the drawing, the change pedal 65 includes a cylindrical bearing portion 87 which is rotatably mounted on a support shaft 85 which is arranged close to the rider step 61 of the step support member 63 with an L-shaped pedal arm 88 mounted on the bearing portion 87, and a columnar step-in portion 92 mounted on a distal end of a main arm portion 91 which constitutes a portion of the pedal arm 88. A distal end of a sub arm portion 93 is an arm portion constituting a portion of the pedal arm 88 that has a length shorter than a length of the main arm portion 91. A rod connecting portion 94 is provided to which the first rod 77 is connected.

The first rod 77 includes ball joints 96, 97 which are respectively connected to the rod connecting portion 94 of the change pedal 65 and the bell crank 78 at both ends thereof. A first rod body 98 is arranged between the ball joints 96, 97, and a plurality of locking nuts 101 which prevent the rotation of the first rod body 98 when the first rod body 98 is connected to the ball joints 96, 97. Male threads 98a, 98b are formed on both ends of the first rod body 98.

The bell crank 78 includes a cylindrical bearing portion 104 which is rotatably mounted on a support shaft 103 mounted on the pivot support member 39, and a bell crank plate 105 which is mounted on the cylindrical bearing portion 104, wherein rod connecting portions 111, 112 which are connected to the first rod 77 and the second rod 81 are mounted on respective distal ends of two arm portions 106, 107 of the bell crank plate 105. A shaft mounting portion 39a is formed on the pivot support member 39 for mounting the support shaft 103.

The second rod 81 includes ball joints 114, 115 which are respectively connected to the bell crank 78 and the transmission shaft arm 82 at both ends thereof with a second rod main body 116 arranged between the ball joints 114, 115. A plurality of locking nuts 117 are provided for preventing the rotation of the second rod main body 116 when the second rod main body 116 is connected to the ball joints 114, 115. Male threads 116a, 116b are formed on both end portions of the second rod main body 116.

The transmission shaft arm 82 includes a split groove 121 which is formed in one end thereof for mounting the transmission shaft arm 82 to the transmission shaft 72 with a bolt 122 for fastening one end of the transmission shaft 82 where the split groove 121 is formed. Further, the transmission shaft arm 82 includes a rod connecting portion 123 which is connected to the second rod 81 on the other end thereof.

By arranging the support shaft 103 which constitutes a swing shaft of the above-mentioned bell crank 78 below the upper end portion 61a of the rider step 61 (a symbol H shown in the drawing indicating a height difference between the upper end portion 61a of the rider step 61 and an axis of the support shaft 103), the bell crank 78 and the first rod 77 are arranged below the rider's foot. Thus, the bell crank 78 and the first rod 77 become inconspicuous. Even when the bell crank 78 and the first rod 77 are viewable, the change pedal 65 and the first rod 77 are arranged substantially parallel to each other. Thus, the change pedal 65 and the first rod 77 are balanced in appearance whereby a rider feels no discomfort. Further, the second rod 81 is also arranged substantially parallel to the pivot support member 39. Thus, the appearance of the motorcycle can be enhanced.

Figure 4:
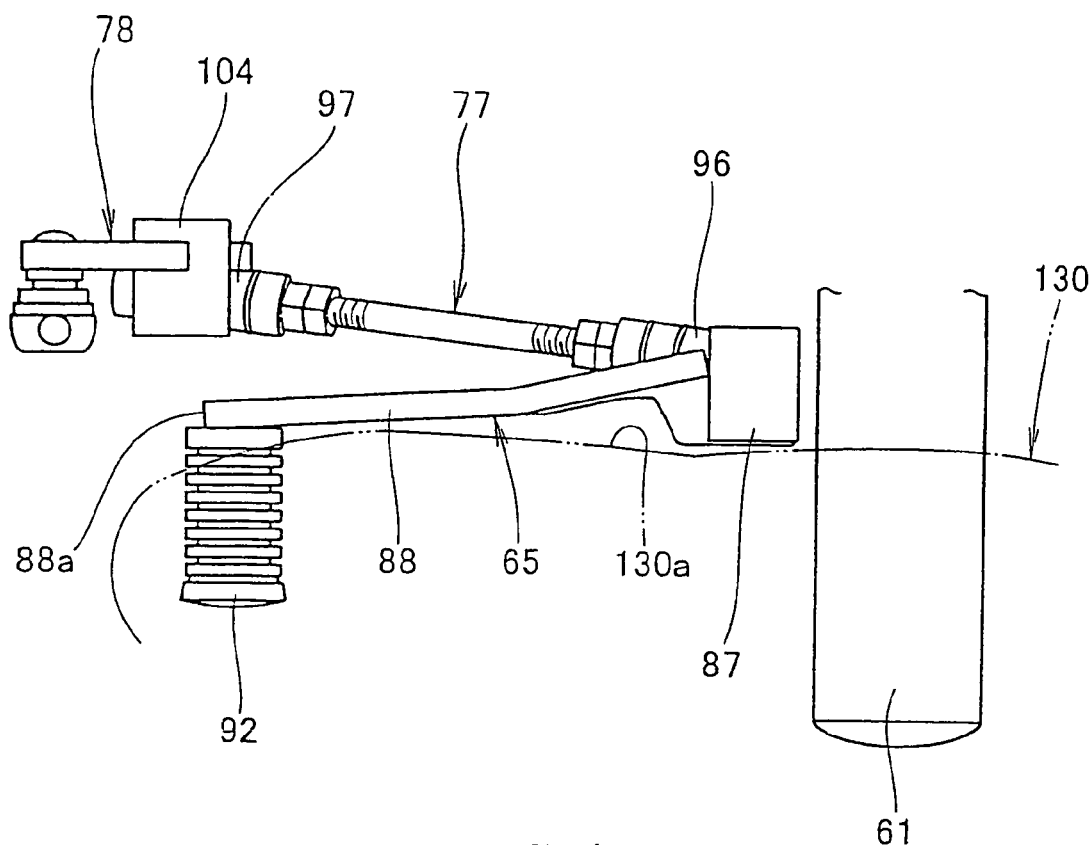
FIG. 4 is a view in the direction indicated by an arrow 4 shown in FIG. 3.

FIG. 4 is a view as viewed in the direction indicated by an arrow 4 in FIG. 3. In FIG. 4, a distal end portion 88a of the pedal arm 88 of the change pedal 65 is arranged more outside of the vehicle than the bearing portion 87 side, and the bearing portion 104 of the bell crank 78 is arranged more inside of the vehicle than the bearing portion 87 of the change pedal 65. Thus, the ball joint 97 side of the first rod 77 is arranged to be more inside of the vehicle than the ball joint 96 side.

Accordingly, the first rod 77 and the bell crank 78 are disposed away from a rider's foot 130 that is placed on the rider step 61 and the step-in portion 92 of the change pedal 65.

Figure 5:
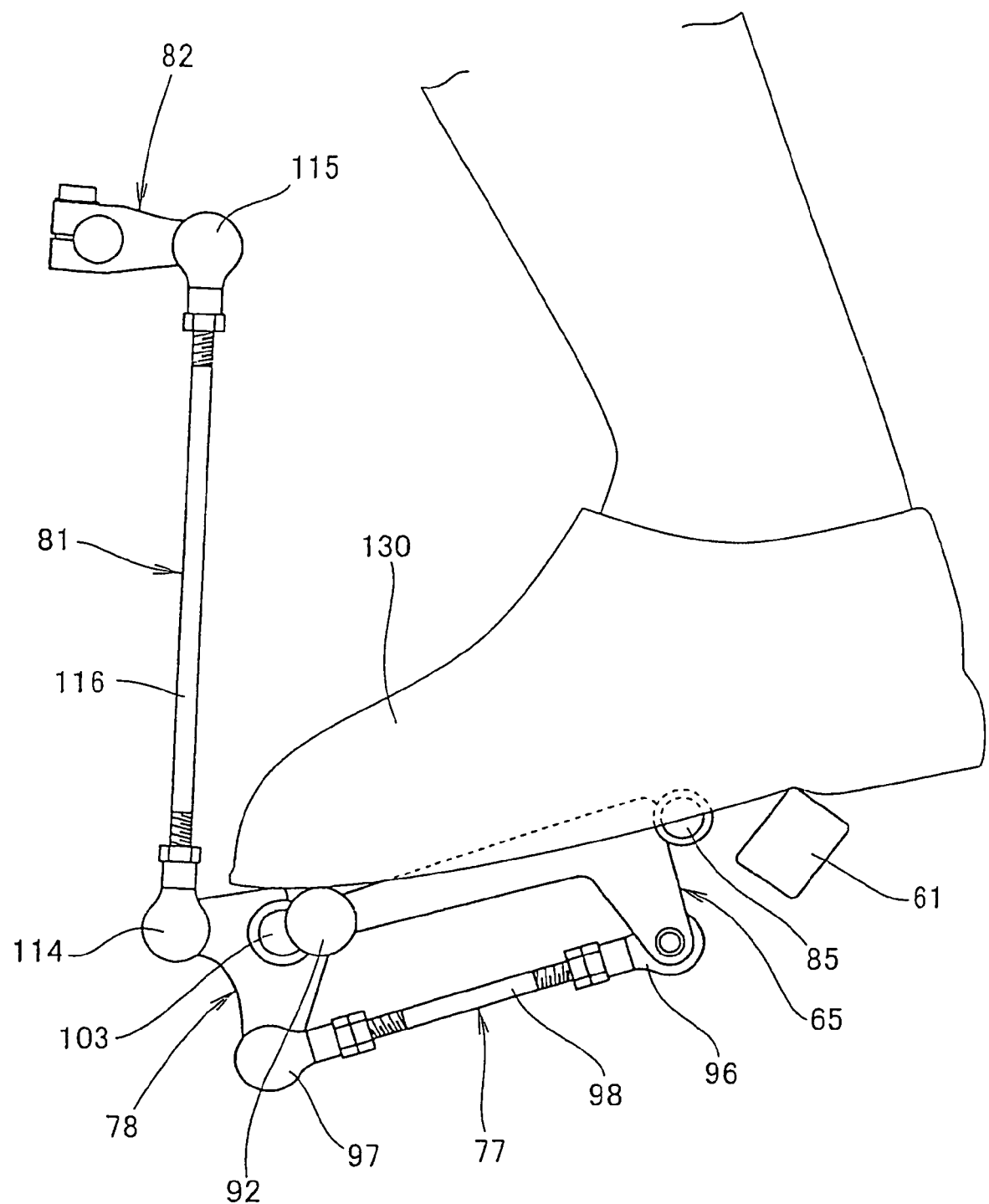
FIG. 5 is an operation view showing an operation of the transmission manipulating device according to the present invention.

FIG. 5 is an operational view showing the manner of operation of the transmission manipulating device according to the present invention.

When the rider places his/her foot 130 (numeral 130a indicating an inside surface of the foot 130) on the rider step 61 and the step-in portion 92 of the change pedal 65, the first rod 77 and the bell crank 78 are positioned below the foot 130. Accordingly, as viewed from the side of the vehicle, the first rod 77 and the bell crank 78 become inconspicuous. Even when the first rod 77 and the bell crank 78 are viewable, the first rod 77 and the change pedal 65 are arranged substantially parallel to each other. Thus, the first rod 77 and the change pedal 65 are balanced in appearance thus giving an impression with no discomfort to the rider.

As has been explained heretofore in conjunction with FIG. 1 and FIG. 3, the transmission manipulating device 67, the engine 14 and the transmission 15 are arranged at the approximate center of a vehicle body frame 11 with the pair of pivot shaft support members 39, 39 (only symbol 39 is shown in the drawing) for supporting the pivot shaft 38 of the swing arm 45 being mounted on the vehicle body frame 11 behind the transmission 15. More specifically, on left and right sides of the main pipe 32, the transmission shaft 72 for changing the speed is mounted on the transmission 15 with the rider step 61 and the support shaft 85 of the change pedal 65 being arranged behind the pivot support member 39, and the change pedal 65 and the transmission shaft 72 being connected with each other by way of the rods 77, 81. The bell crank 78 is arranged below the rider step 61 with the first rod 77 that connects the change pedal 65 and the bell crank 78 with each other and the second rod 81 that connects the bell crank 78 and the transmission shaft 72 side with each other. The second rod 81 is arranged in front of the change pedal 65.

The bell crank 78 is arranged below the rider step 61, the rod includes the first rod 77 which connects the change pedal 65 and the bell crank 78 with each other and the second rod 81 which connects the bell crank 78 and the transmission shaft 72 side with each other. The second rod 81 is arranged in front of the change pedal 65. Accordingly, when the rider performs a gear change using the transmission 15, the rider's foot 130 (see FIG. 5) hardly interferes with the second rod 81. Thus, the transmission manipulability of the vehicle can be enhanced.

The present invention is, secondly, characterized in that the bell crank 78 is rotatably supported on the pivot support member 39.

The bell crank 78 is supported on the pivot support member 39 that supports the pivot shaft 38. Thus, the pivot support member 39 also serves as the support member of the bell crank 78 whereby the number of parts can be reduced thus bringing about a reduction in the weight of the vehicle and a reduction in the cost. Further, by arranging the change pedal 65 in the vicinity of the bell crank 78, a distance between a connecting portion of the first rod 77 with the change pedal 65 and the bell crank 78 becomes short. Thus, the first rod 77 can be shortened thus reducing the weight of the vehicle.

The present invention is, thirdly, characterized in that the bell crank 78 and the transmission shaft 72 are arranged in front of the change pedal 65, and the transmission shaft 72 is arranged above the rider step 61.

Since the transmission shaft 72 is arranged above the rider step 61, it is possible to arrange the transmission shaft 72 above the output shaft 15A of the transmission 15. Accordingly, a distance between the output shaft 15A and the transmission shaft 72 in the longitudinal direction of the vehicle body can be shortened. Thus, a longitudinal length of the engine 14 can be shortened.

Here, although the bell crank is rotatably supported on the pivot support member in the present invention, the present invention is not limited to such a constitution and the bell crank may be rotatably supported on a casing of the transmission.

The transmission manipulating device of the present invention is suitably applicable to a two-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle-use transmission manipulating device in which an engine and a transmission which is connected to the engine are arranged at the approximate center of a vehicle body, a pair of pivot support members for supporting a pivot shaft of a swing arm is provided at left and right sides of the vehicle body behind the transmission, a transmission shaft is provided for the transmission, a step and a change pedal are provided behind the pivot support member, and the change pedal and the transmission shaft are connected with each other by way of a rod, the vehicle-use transmission manipulating device comprising:
   a bell crank operatively arranged on a bell crank support shaft which is positioned below the step secured to the vehicle body,
   wherein the change pedal is operatively mounted on a change pedal support shaft which is mounted adjacent to the step,
   wherein the rod includes
      a first rod having a forward end connected to a distal end of a lower arm portion of the bell crank via a forward connecting portion, and having a rear end connected to a downwardly extending portion of the change pedal via a rear connecting portion, and
   wherein the bell crank and the transmission shaft are arranged in front of the change pedal, and with a vehicle front wheel and a vehicle rear wheel standing upright on a horizontal surface, the transmission shaft is arranged above the change pedal and the step.

2. The vehicle-use transmission manipulating device according to claim 1, wherein the bell crank is rotatably supported via the bell crank support shaft on one of the pivot support members, and
   further comprising
   a second rod extending upwardly from a distal end of an upper arm portion of the bell crank for connecting the bell crank and the transmission shaft,
   wherein in the side view of the vehicle body, the second rod overlaps a chain providing rotational power to the vehicle rear wheel.

3. The vehicle-use transmission manipulating device according to claim 1, wherein in the side view of the vehicle body, a center of bell crank support shaft is lower than the support shaft of the change pedal and higher than a center of the rear connecting portion at the rear end of the first rod.

4. The vehicle-use transmission manipulating device according to claim 1, wherein said change pedal includes a forwardly extending portion extending forward of the change pedal support shaft, and the downwardly extending portion extending downwardly from the forwardly extending portion.

5. The vehicle-use transmission manipulating device according to claim 1, wherein said bell crank is rotatably supported via the bell crank support shaft on one of the pivot support members which extends in a direction that is substantially parallel to the second rod.

6. The vehicle-use transmission manipulating device according to claim 1, wherein a connection between the lower arm portion of the bell crank and the forward end of said first rod includes a ball joint for operatively connecting the lower arm portion of the bell crank to the first rod, and a connection between the upper arm portion of the bell crank and the second rod includes a ball joint for operatively connecting the upper arm portion of the bell crank to the second rod.

7. The vehicle-use transmission manipulating device according to claim 1, wherein the change pedal and the bell crank are arranged adjacent to each other for reducing a length of said first rod.

8. The vehicle-use transmission manipulating device according to claim 1, in the side view of the vehicle body, the second rod extending upwardly is arranged between an output shaft and the pivot support members.

9. The vehicle-use transmission manipulating device according to claim 1, wherein the change pedal and the first rod extending rearwardly from the distal end of the lower arm portion of the bell crank are arranged to be substantially parallel relative to each other.

10. The vehicle-use transmission manipulating device according to claim 1, wherein the change pedal and the bell crank are arranged adjacent to each other for reducing a length of said first rod.

11. A vehicle-use transmission manipulating device comprising:
    a pair of pivot support members for supporting a pivot shaft of a swing arm, said pair of pivot support members being provided at left and right sides of a vehicle body behind a transmission;
    a transmission shaft adapted to be operatively connected to the transmission;
    a step adapted to be secured to the vehicle body, the transmission shaft being arranged above a change pedal and the step;
    the change pedal adapted to be mounted behind the pivot support member, the change pedal and the transmission shaft being operatively connected to each other by a rod; and
    a bell crank operatively arranged on a bell crank support shaft which is positioned below the step;
    wherein the change pedal is operatively mounted on a change pedal support shaft which is mounted adjacent to the step,
    said rod including:
       a first rod having a forward end connected to a distal end of a lower arm portion of the bell crank via a forward connecting portion, and having a rear end connected to a downwardly extending portion of the change pedal via a rear connecting portion, and
       in a side view of the vehicle body, a horizontal line extending through a center of the bell crank support shaft is lower than the support shaft of the change pedal and higher than a center of the rear connecting portion at the rear end of the first rod.

12. The vehicle-use transmission manipulating device according to claim 11, wherein the bell crank is rotatably supported via the bell crank support shaft on one of the pivot support members, and
    further comprising
    a second rod extending upwardly from a distal end of an upper arm portion of the bell crank for connecting the bell crank and the transmission shaft,
    in the side view of the vehicle body, the second rod overlaps a chain providing rotational power to a vehicle rear wheel.

13. The vehicle-use transmission manipulating device according to claim 11, wherein the bell crank and the transmission shaft are arranged in front of the change pedal, and with a vehicle front wheel and a vehicle rear wheel standing upright on a horizontal surface, the transmission shaft is arranged above the change pedal and the step.

14. The vehicle-use transmission manipulating device according to claim 11, wherein said change pedal includes a forwardly extending portion extending forward of the change pedal support shaft, and the downwardly extending portion extending downwardly from the forwardly extending portion.

15. The vehicle-use transmission manipulating device according to claim 11, wherein said bell crank is rotatably supported via the bell crank support shaft on one of the pivot support members which extends in a direction that is substantially parallel to the second rod.

16. The vehicle-use transmission manipulating device according to claim 11, wherein a connection between the lower arm portion of the bell crank and the forward end of said first rod includes a ball joint for operatively connecting the lower arm portion of the bell crank to the first rod, and a connection between the upper arm portion of the bell crank and the second rod includes a ball joint for operatively connecting the upper arm portion of the bell crank to the second rod.

17. The vehicle-use transmission manipulating device according to claim 11, in side view of the vehicle body, the second rod extending upwardly is arranged between an output shaft and the pivot support members.

18. The vehicle-use transmission manipulating device according to claim 11, wherein the change pedal and the first rod extending rearwardly from the distal end of the lower arm portion of the bell crank are arranged to be substantially parallel relative to each other.

* * * * *